(12) United States Patent
Yamashita

(10) Patent No.: US 9,246,580 B2
(45) Date of Patent: Jan. 26, 2016

(54) OPTICAL ADD-DROP MULTIPLEXER (OADM) DEVICE

(75) Inventor: Naotaka Yamashita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 323 days.

(21) Appl. No.: 13/643,772

(22) PCT Filed: Jun. 9, 2011

(86) PCT No.: PCT/JP2011/003274
§ 371 (c)(1),
(2), (4) Date: Oct. 26, 2012

(87) PCT Pub. No.: WO2011/161891
PCT Pub. Date: Dec. 29, 2011

(65) Prior Publication Data
US 2013/0039647 A1   Feb. 14, 2013

(30) Foreign Application Priority Data
Jun. 24, 2010   (JP) .................. 2010-143908

(51) Int. Cl.
*H04B 10/08*   (2006.01)
*H04B 10/077*   (2013.01)
*H04J 14/02*   (2006.01)

(52) U.S. Cl.
CPC ........ *H04B 10/0771* (2013.01); *H04B 10/0777* (2013.01); *H04J 14/0212* (2013.01); *H04J 14/0221* (2013.01)

(58) Field of Classification Search
CPC  H04B 10/07–10/0799; H04B 10/29–10/2939; H04J 14/02–14/0221
USPC ............. 398/9, 16–25, 30–34, 37, 38, 82–85, 398/173, 174, 177, 180, 181
See application file for complete search history.

(56) References Cited

U.S. PATENT DOCUMENTS 6,404,523 B1 *   6/2002   Morikawa et al. ............... 398/79
7,542,675 B1 *   6/2009   Graves et al. ................... 398/45

(Continued)

FOREIGN PATENT DOCUMENTS

JP   2004 32088   1/2004
JP   2004 40241   2/2004

(Continued)

OTHER PUBLICATIONS

International Search Report Issued Aug. 9, 2011 in PCT/JP11/003274 Filed Jun. 9, 2011.

*Primary Examiner* — Li Liu
(74) *Attorney, Agent, or Firm* — Oblon, McClelland, Maier & Neustadt, L.L.P.

(57) ABSTRACT

An OADM device is provided with a variable optical attenuator 73 for attenuating a light signal into which a received light signal is demultiplexed by an optical demultiplexing functional unit 71, a modulating circuit 7 for piggybacking an ID number of a corresponding transmitting port onto the light signal by using the variable optical attenuator, an optical reception detector 84 for detecting the light level of a light signal received via a receiving port, a demodulating circuit 85 for extracting the ID number from the light level detected by the optical reception detector, an ID number management unit 91 for determining whether the ID number extracted by the demodulating circuit matches an ID number set thereby, and a notifying unit 9 for notifying a connection failure occurring in an optical patch cable 14 when the ID number management unit determines that there is a mismatch between the ID numbers.

3 Claims, 5 Drawing Sheets

(56) References Cited

U.S. PATENT DOCUMENTS

| | | | |
|---|---|---|---|
| 2003/0185567 A1* | 10/2003 | Kurumida et al. | 398/79 |
| 2003/0223745 A1* | 12/2003 | Tomofuji et al. | 398/9 |
| 2007/0280700 A1* | 12/2007 | Remedios et al. | 398/183 |
| 2008/0138074 A1 | 6/2008 | Ohtou et al. | |
| 2009/0290870 A1* | 11/2009 | Koyano et al. | 398/25 |
| 2010/0172644 A1* | 7/2010 | Uchiyama et al. | 398/7 |
| 2010/0220998 A1* | 9/2010 | Sekiya | 398/34 |
| 2011/0158641 A1* | 6/2011 | Barnard et al. | 398/25 |
| 2011/0293273 A1* | 12/2011 | Futami | 398/48 |
| 2012/0070154 A1* | 3/2012 | Portier et al. | 398/136 |

FOREIGN PATENT DOCUMENTS

| | | | | |
|---|---|---|---|---|
| JP | 2004 312256 | | 11/2004 | |
| JP | 2005-229387 | * | 5/2005 | H04B 10/08 |
| JP | 2005 229387 | | 8/2005 | |
| JP | 2007 57642 | | 3/2007 | |
| JP | 2008 147968 | | 6/2008 | |

* cited by examiner

OPTICAL ADD-DROP MULTIPLEXER (OADM) DEVICE

FIELD OF THE INVENTION

The present invention relates to an OADM (Optical Add-Drop Multiplexer) device which transmits a light signal by using a wavelength division multiplex technique, for monitoring a connection with an optical patch cable which is used therein.

BACKGROUND OF THE INVENTION

A wavelength multiplexed light signal network which employs OADM devices using a wavelength division multiplex (WDM) technique are placed in operation under present circumstances in accordance with a path setting in which the network is closed within a ring which consists of about several to more than ten OADM devices. However, two or more rings of this type exist actually, and a wavelength multiplexed light signal network is configured in a form in which the two or more rings are connected in a row. Therefore, there will be a demand for a larger path setting in which a wavelength multiplexed light signal network is placed in operation across a plurality of rings, and attention is given to a wavelength select switch (WSS) as a means for implementing this demand.

On the other hand, in a wavelength division multiplex device, such as an OADM device, an optical demultiplexing unit which demultiplexes a light signal and an optical multiplexing unit which multiplexes light signals are connected to each other via an optical patch cable, and an optical multiplexing/demultiplexing unit which consists of the optical demultiplexing unit and the optical multiplexing unit and an interface unit for connecting with another device are connected to each other via an optical patch cable. However, because the system is based on the premise that a connection job of connecting between units using such an optical patch cable is done manually by a worker, the detection of a connection failure caused by an erroneous operation in the connection job is a very important issue at the time of quick construction, at the time of restoring the system to proper working condition when an emergency failure is occurring, etc.

Because when the optical multiplexing/demultiplexing unit wavelength-demultiplexes a wavelength multiplexed light signal into light signals having individual wavelengths, or inversely multiplexes light signals having individual wavelengths into a wavelength multiplexed light signal, the transmission of the light signals is carried out only in a single direction, there is a one-to-one correspondence between the transmitting ports of the optical demultiplexing unit and the receiving ports of the optical multiplexing unit, and this correspondence is determined beforehand and mechanically in the system. Therefore, the worker should just connect an optical patch cable between two transmitting and receiving ports which are determined mechanically without errors.

Such an OADM device detects and compares the light level of a light signal transmitted from a transmitting port of an optical demultiplexing unit thereof, and the light level of a light signal received at a receiving port of an optical multiplexing unit thereof with each other to detect a connection failure occurring in an optical patch cable. More specifically, after connecting between a transmitting port a and a receiving port a by using an optical patch cable a first, for example, the light level of a light signal at the transmitting port a and the light level of a light signal at the receiving port a are detected and compared with each other. When both the light levels have appropriate values, it is determined that the optical patch cable a is connected normally between the transmitting port and the receiving port, whereas when both the light levels do not have appropriate values, it is determined that a connection failure occurs in the optical patch cable a for connecting between the transmitting port and the receiving port. Then, the next transmitting port b and the receiving port b are connected to each other by using an optical patch cable b, and the light level of a light signal at the transmitting port b and the light level of a light signal at the receiving port b are detected and compared with each other to determine the connection state of the optical patch cable b. After that, a process of detecting a connection failure is carried out on all remaining optical patch cables in the same way (for example, refer to patent reference 1).

However, because when an optical multiplexing/demultiplexing unit has a wavelength select switch, the optical multiplexing/demultiplexing unit can determine whether or not to have no choice but to wavelength-demultiplex a wavelength multiplexed light signal input thereto into light signals having different wavelengths, the OADM device can be set up to transmit two or more light signals having different wavelengths (n transmission signals/n reception signals) via each port. In this setup, arbitrary ports can be specified and therefore a light signal can be transmitted via many paths. Therefore, ports which are connected to each other by using an optical patch cable are not determined uniquely and mechanically, and therefore a connection failure occurring in an optical patch cable cannot be detected only through the detection and comparison of the light levels mentioned above.

To solve this problem, in an OADM device having such a wavelength select switch, each light amplifier is used to piggyback the ID number of a transmitting port onto a light signal transmitted from an optical demultiplexing unit and the ID number is extracted from the light signal received at a receiving port of an optical multiplexing unit, and the detection of a connection failure occurring in an optical patch cable is carried out for each light amplifier (for example, refer to patent reference 2).

RELATED ART DOCUMENT

Patent Reference

Patent reference 1: Japanese Unexamined Patent Application Publication No. 2007-57642
Patent reference 2: Japanese Unexamined Patent Application Publication No. 2004-40241

SUMMARY OF THE INVENTION

Problems to be Solved by the Invention

A problem with the OADM device disclosed by this patent reference 2 is, however, that because the ID number is piggybacked onto a light signal by using a light amplifier, this light amplifier is needed for each stage in which a wavelength multiplexed light signal is demultiplexed into light signals having wavelengths, and the OADM device is very expensive and is hard to downsize and hence it is very difficult to perform a control operation on a per-wavelength basis.

The present invention is made in order to solve the above-mentioned problem, and it is therefore an object of the present invention to provide an OADM device which, even in a case in which transmission and reception ports can be arbitrarily set up in an optical multiplexing/demultiplexing unit, detects a connection failure occurring in an optical patch cable by using a low-cost method, thereby being able to contribute to quick installation thereof and reduction in the time required to restore itself to proper working condition when an emergency failure is occurring.

Means for Solving the Problem

In accordance with the present invention, there is provided an OADM device including: a variable optical attenuator for attenuating a light signal into which a received light signal is demultiplexed by an optical demultiplexing functional unit; a modulating circuit for piggybacking an ID number of a corresponding transmitting port onto the light signal by using the variable optical attenuator; an optical reception detector for detecting a light level of the light signal received via a receiving port; a demodulating circuit for extracting an ID number from the light level detected by the optical reception detector; an ID number management unit for determining whether the ID number extracted by the demodulating circuit matches an ID number set thereby; and a notifying unit for notifying a connection failure occurring in an optical patch cable when the ID number management unit determines that there is a mismatch between the ID numbers.

Advantages of the Invention

As mentioned, because the OADM device in accordance with the present invention is constructed in such a way as to include: the variable optical attenuator for attenuating a light signal into which a received light signal is demultiplexed by the optical demultiplexing functional unit; the modulating circuit for piggybacking an ID number of a corresponding transmitting port onto the light signal by using the variable optical attenuator; the optical reception detector for detecting the light level of the light signal received via a receiving port; a demodulating circuit for extracting the ID number from the light level detected by the optical reception detector; the ID number management unit for determining whether the ID number extracted by the demodulating circuit matches an ID number set thereby; and the notifying unit for notifying a connection failure occurring in the optical patch cable when the ID number management unit determines that there is a mismatch between the ID numbers. Therefore, the OADM device can detect a connection failure occurring in the optical patch cable by using a low-cost method even though the OADM device is constructed in such a way that the transmission and reception ports of the optical multiplexing/demultiplexing unit can be set up arbitrarily, thereby being able to contribute to quick installation thereof and reduction in the time required to restore itself to proper working condition when an emergency failure is occurring.

EMBODIMENTS OF THE INVENTION

Hereafter, the preferred embodiments of the present invention will be explained in detail with reference to the drawings.
Embodiment 1

Figure 1:
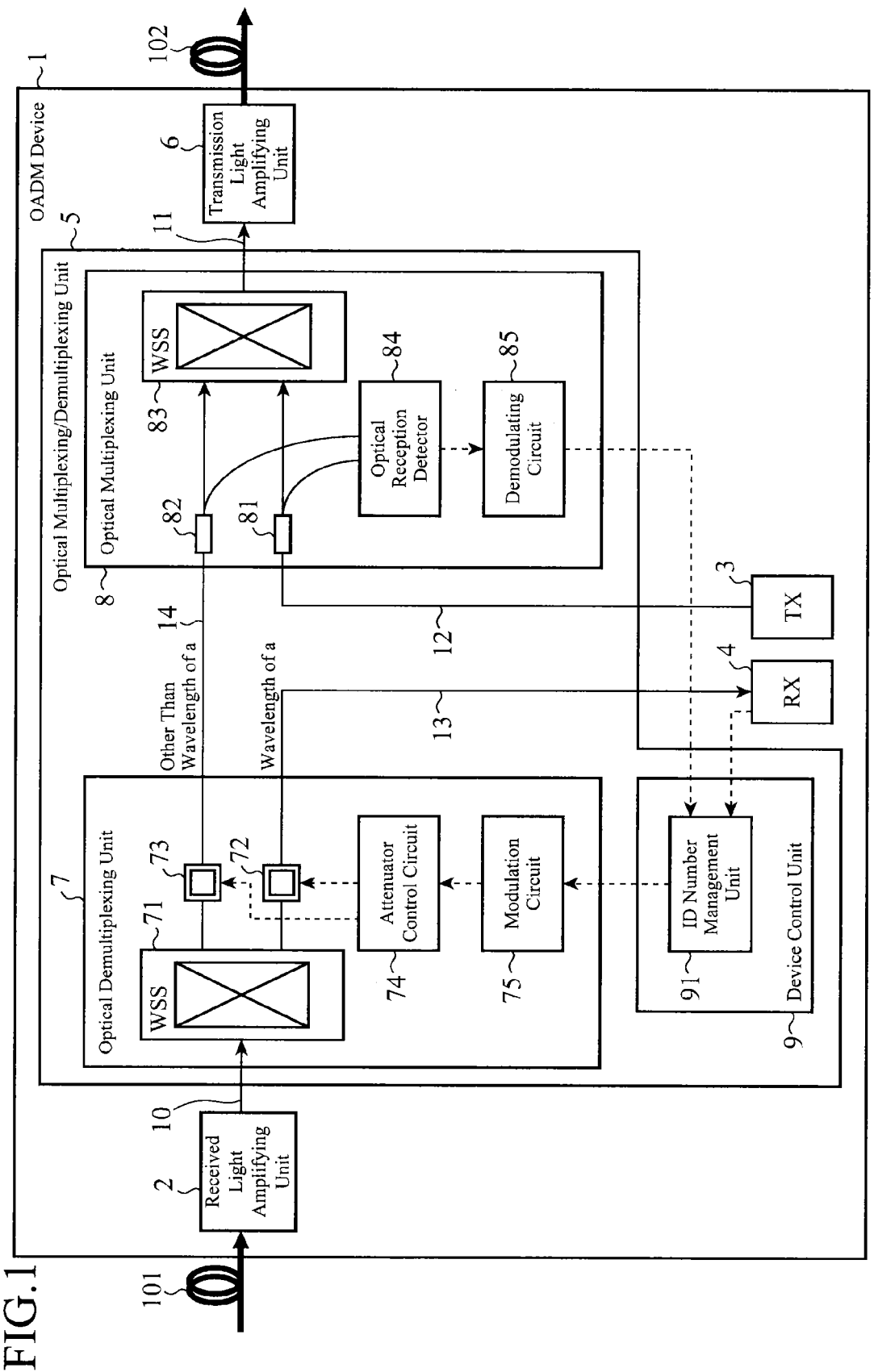
FIG. 1 is a view showing the structure of an OADM device in accordance with Embodiment 1 of the present invention.

FIG. 1 is a view showing the structure of an OADM device 1 in accordance with Embodiment 1 of the present invention. The OADM device 1 is comprised of a received light amplifying unit 2, a signal transmitting unit (TX) 3, a signal receiving unit (RX) 4, an optical multiplexing/demultiplexing unit 5, and a transmission light amplifying unit 6, as shown in FIG. 1.

The received light amplifying unit 2 carries out optical amplification on a wavelength multiplexed light signal received from an upstream OADM device (not shown in the figure) via a transmission line 101 in accordance with a loss in light levels due to the transmission line 101. The wavelength multiplexed light signal optically amplified by this received light amplifying unit 2 is transmitted to the optical multiplexing/demultiplexing unit 5 via an optical patch cable 10.

The signal transmitting unit 3 transmits a light signal having a specific wavelength to the optical multiplexing/demultiplexing unit 5 via an optical patch cable 12. The signal transmitting unit 3 piggybacks an ID number assigned to a corresponding transmitting port to the light signal transmitted thereby. The signal receiving unit 4 receives a light signal having a specific wavelength into which a wavelength multiplexed light signal is demultiplexed by the optical multiplexing/demultiplexing unit 5 via an optical patch cable 13. The signal receiving unit 4 detects the light level of the received light signal to extract an ID number. This extracted ID number is transmitted to an ID number management unit 91 which will be mentioned later.

The optical multiplexing/demultiplexing unit 5 carries out multiplexing/demultiplexing on the wavelength multiplexed light signal received from the received light amplifying unit 2 via the optical patch cable 10. This optical multiplexing/demultiplexing unit 5 is comprised of an optical demultiplexing unit 7, an optical multiplexing unit 8, and a device control unit 9.

The optical demultiplexing unit 7 demultiplexes the wavelength multiplexed light signal received from the received light amplifying unit 2 via the optical patch cable 10. This optical demultiplexing unit 7 is comprised of a wavelength select switch (WSS, an optical demultiplexing functional unit) 71, a first variable optical attenuator (VOA) 72, a second variable optical attenuator (VOA) 73, an attenuator control circuit 74, and a modulating circuit 75.

The wavelength select switch 71 demultiplexes the wavelength multiplexed light signal received from the received light amplifying unit 2 via the optical patch cable 10 into light signals having different wavelengths to extract a light signal having a specific wavelength (a wavelength of a), and wavelength-multiplexes the remaining light signals having wavelengths other than the specific wavelength into a wavelength multiplexed light signal. The light signal having the specific wavelength extracted by this wavelength select switch 71 is transmitted to the first variable optical attenuator 72, and the wavelength multiplexed light signal into which the remaining light signals having wavelengths other than the specific wavelength are multiplexed is transmitted to the second variable optical attenuator 73.

The first variable optical attenuator 72 attenuates the light signal received from the wavelength select switch 71 in accordance with control by the attenuator control circuit 74 for the purpose of, for example, making a light level correction to the light signal, and blocking the channel before the OADM device is placed in operation. The light signal which is optically attenuated by this first variable optical attenuator 72 is transmitted to the signal receiving unit 4 via the optical patch cable 13.

The second variable optical attenuators 73 attenuates the wavelength multiplexed light signal received from the wavelength select switch 71 in accordance with control by the attenuator control circuit 74 for the purpose of, for example, making a light level correction to the wavelength multiplexed light signal, and blocking the channel before the OADM device is placed in operation. The wavelength multiplexed light signal which is optically attenuated by this second variable optical attenuator 73 is transmitted to the optical multiplexing unit 8 via the optical patch cable 14.

The attenuator control circuit 74 controls the amount of light attenuation which is provided for the light signal by each of the variable optical attenuators 72 and 73. This attenuator control circuit 74 is typically comprised of an FPGA (Field Programmable Gate Array) or the like, and also has an interface function to a CPU of the device control unit 9.

The modulating circuit 75 uses the variable optical attenuators 72 and 73 to piggyback the ID number of the corresponding transmitting port onto the wavelength multiplexed light signal and the light signal by performing amplitude modulation (ASK: Amplitude-Shift Keying). Because this ID number should just have a number of bits by which the number of transmitting ports to be used can be expressed, the ID number can be transmitted by using a signal having a very low rate (for example, when the numbers of ports is 32, the ID number can be implemented by (5 bits+an error check bit) when expressed by a binary number).

Figure 2:
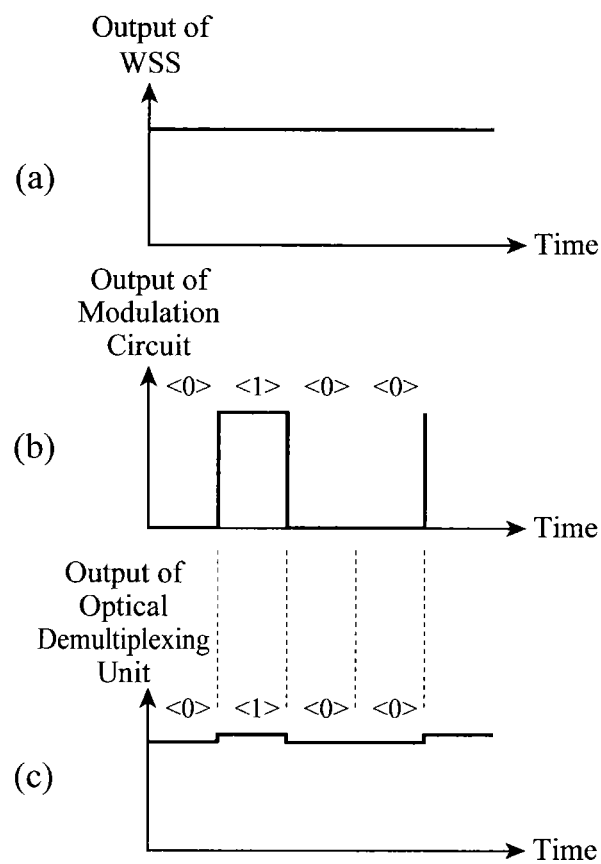
FIG. 2 is a view explaining the piggybacking of an ID number which is carried out by the OADM device in accordance with Embodiment 1 of the present invention.

FIG. 2 is a view for explaining the piggybacking of an ID number in the OADM device 1 in accordance with Embodiment 1 of the present invention. FIG. 2(a) is a view showing an output of the wavelength select switch 71, FIG. 2(b) is a view showing an output of the modulating circuit 75, and FIG. 2(c) is a view showing an output of the optical demultiplexing unit 7. The modulating circuit 75 can piggyback the ID number of the corresponding transmitting port, as shown in FIG. 2(c), by carrying out amplitude modulation as shown in FIG. 2(b) on the wavelength multiplexed light signal and the light signal from the wavelength select switch 71 which are shown in FIG. 2(a). The attenuator control circuit 74 also carries out a control process of correcting the amount of variation on a light signal received from outside the OADM device due to disturbance in order to reduce the influence of this disturbance. To this end, the OADM device 1 is designed in such a way as to present no problem even if some variations occur in the outputs of the variable optical attenuators 72 and the 73. Therefore, no problem arises even though variations in light levels falling within predetermined limits are imposed on both the wavelength multiplexed light signal and the light signal by using the variable optical attenuators 72 and 73, as shown in FIG. 2.

Further, the optical multiplexing unit 8 multiplexes the light signal received from the signal transmitting unit 3 via the optical patch cable 12, and the wavelength multiplexed light signal received from the optical demultiplexing unit 7 via the optical patch cable 14 into a signal. This optical multiplexing unit 8 is comprised of a first optical branching circuit 81, a second optical branching circuit 82, a wavelength select switch (WSS, an optical demultiplexing functional unit) 83, an optical reception detector 84, and a demodulating circuit 85.

The first optical branching circuit 81 branches the light signal having a specific wavelength received from the signal transmitting unit 3 via the optical patch cable 12 into two light signals. One of the light signals into which the light signal having a specific wavelength is branched by this first optical branching circuit 81 is transmitted to the wavelength select switch 83 while the other light signal is transmitted to the optical reception detector 84.

The second optical branching circuit 82 branches the wavelength multiplexed light signal received from the optical demultiplexing unit 7 via the optical patch cable 14 into two light signals. One of the light signals into which the light signal having a specific wavelength is branched by this second optical branching circuit 82 is transmitted to the wavelength select switch 83 while the other light signal is transmitted to the optical reception detector 84.

The wavelength select switch 83 multiplexes the light signal received from the first optical branching circuit 81 and the wavelength multiplexed light signal received from the second optical branching circuit 82 into a wavelength multiplexed light signal. The wavelength multiplexed light signal into which the light signal received from the first optical branching circuit and the wavelength multiplexed light signal received from the second optical branching circuit are multiplexed by this wavelength select switch 83 is transmitted to the transmission light amplifying unit 6 via an optical patch cable 11.

The optical reception detector 84 has an optical light receiving element for detecting the light level of the light signal received from the first optical branching circuit 81, and the light level of the wavelength multiplexed light signal received from the second optical branching circuit 82. This optical reception detector 84 is comprised of an FPGA or the like, and also has an interface function to the CPU of the device control unit 9. The optical light receiving element which the optical reception detector 84 has should just have a dynamic range for amplitudes. Because a very low cost part can be used as the optical light receiving element, the optical reception detector can be implemented at a low cost.

The demodulating circuit 85 extracts the ID number from each of the light levels detected by the optical reception detector 84. The ID number extracted by this demodulating circuit 85 is transmitted to the device control unit 9.

The device control unit 9 manages the whole of the OADM device 1, and carries out signal processing, control, etc. on the attenuator control circuit 74 and the optical reception detector 84. This device control unit 9 is provided with the ID number management unit 91. The device control unit 9 also has a function serving as a notifying unit for notifying a TIM (Trace Identifier Mismatch) or a fiber break alarm in accordance with the determination of a mismatch of the ID number by the ID number management unit 91 to a maintenance operator.

The ID number management unit 91 compares the ID number extracted by the demodulating circuit 85 and the signal receiving unit 4 with a preset expected value (an ID number) to determine whether they match each other. When determining that the ID number does not match the expected value, the ID number management unit 91 notifies the device control unit 9 to that effect.

The transmission light amplifying unit 6 carries out optical amplification on the wavelength multiplexed light signal received from the wavelength select switch 83 in accordance with a loss in light levels due to the optical multiplexing/demultiplexing unit 5. The wavelength multiplexed light signal optically amplified by this transmission light amplifying unit 6 is sent out toward a downstream OADM device (not shown) via a transmission line 102.

Figure 3:
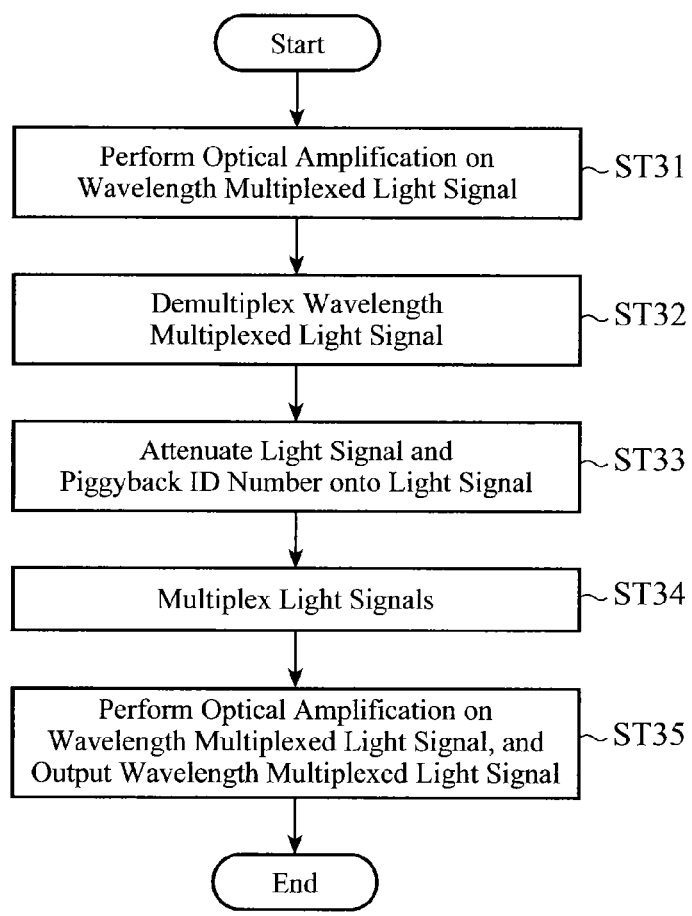
FIG. 3 is a flow chart showing a fundamental operation of the OADM device in accordance with Embodiment 1 of the present invention.

Next, a fundamental operation of the OADM device 1 which is constructed as above will be explained. FIG. 3 is a flow chart showing the fundamental operation of the OADM device 1 in accordance with Embodiment 1 of the present invention. In the fundamental operation of the OADM device 1, as shown in FIG. 3, the received light amplifying unit 2 optically amplifies a wavelength multiplexed light signal received from an upstream OADM device via the transmission line 101 in accordance with the loss in light levels due to the transmission line 101 first (step ST31). The wavelength multiplexed light signal optically amplified by this received light amplifying unit 2 is transmitted to the wavelength select switch 71 via the optical patch cable 10.

The wavelength select switch 71 then demultiplexes the wavelength multiplexed light signal received from the received light amplifying unit 2 via the optical patch cable 10 into a light signal having a specific wavelength and a wavelength multiplexed light signal having wavelengths other than the specific wavelength (step ST32). The light signal having the specific wavelength extracted by this wavelength select switch 71 is transmitted to the first variable optical attenuator 72, and the wavelength multiplexed light signal having wavelengths other than the specific wavelength is transmitted to the second variable optical attenuator 73.

The variable optical attenuators 72 and 73 then attenuate the wavelength multiplexed light signal and the light signal which are received from the wavelength select switch 71, respectively, in accordance with the control by the attenuator control circuit 74 (step ST33). When carrying out the light attenuation, the variable optical attenuators 72 and 73 piggyback the ID number of the corresponding transmitting port onto the wavelength multiplexed light signal and the light signal with amplitude modulation using the modulating circuit 75. The light signal which is optically attenuated by the variable optical attenuator 72 and onto which the ID number is piggybacked is transmitted to the signal receiving unit 4 via the optical patch cable 13 while the wavelength multiplexed light signal which is optically attenuated by the variable optical attenuator 73 and onto which the ID number is piggybacked is transmitted to the wavelength select switch 83 via the optical patch cable 14 and then via the second optical branching circuit 82.

The wavelength select switch 83 then multiplexes the light signal received from the signal transmitting unit 3 via the optical patch cable 12, and the wavelength multiplexed light signal received from the optical demultiplexing unit 7 into a wavelength multiplexed light signal (step ST34). The wavelength multiplexed light signal into which the light signal received from the signal transmitting unit and the wavelength multiplexed light signal received from the optical demultiplexing unit are multiplexed by this wavelength select switch 83 is transmitted to the transmission light amplifying unit 6 via the optical patch cable 11. The ID number of the corresponding transmitting port is also piggybacked onto the light signal received from the signal transmitting unit 3.

The transmission light amplifying unit 6 then optically amplifies the wavelength multiplexed light signal received from the wavelength select switch 83 in accordance with the loss in light levels due to the optical multiplexing/demultiplexing unit 5, and sends out the wavelength multiplexed light signal toward a downstream OADM device via the transmission line 102 (step ST35).

Figure 4:
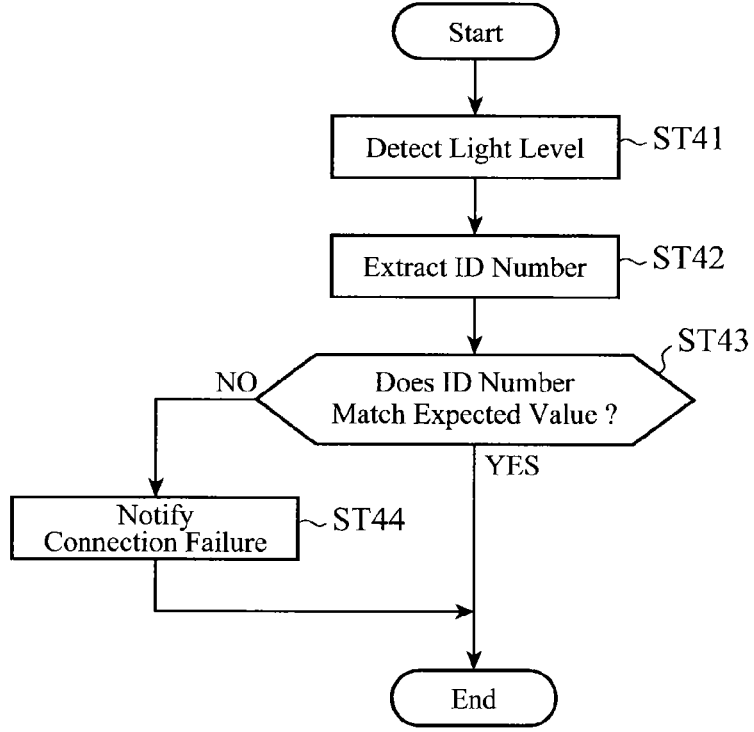
FIG. 4 is a flow chart showing a connection state determining operation carried out by the OADM device in accordance with Embodiment 1 of the present invention.

Next, a connection state determining operation of the OADM device 1 will be explained. FIG. 4 is a flow chart showing the connection state determining operation of the OADM device 1 in accordance with Embodiment 1 of the present invention. In the connection state determining operation of the OADM device 1, as shown in FIG. 4, the optical reception detector 84 detects the light level of the light signal received from the first optical branching circuit 81 and the light level of the wavelength multiplexed light signal received from the second optical branching circuit 82 (step ST41). Data showing the light levels detected by this optical reception detector 84 are transmitted to the demodulating circuit 85.

The demodulating circuit 85 then extracts the ID number from each of the light levels detected by the optical reception detector 84 (step ST42). The ID number extracted by this demodulating circuit 85 is transmitted to the ID number management unit 91. Also the signal receiving unit 4 detects the light level of the light signal received thereby to extract the ID number. The ID number extracted by this signal receiving unit 4 is also transmitted to the ID number management unit 91.

The ID number management unit 91 then compares the ID number which is extracted by the demodulating circuit 85 and the ID number which is extracted by the signal receiving unit 4 with the preset expected value, and determines whether each of the ID numbers matches the preset expected value (step ST43).

When the ID number management unit 91, in this step ST43, determines that each of the ID numbers matches the expected value, the OADM device ends the sequence. In contrast, when the ID number management unit 91, in step ST43, determines that one of the ID numbers does not match the expected value, the OADM device determines that a connection failure occurs in the optical patch cables, and the device control unit 9 notifies an TIM or a fiber break alarm to a maintenance operator (step ST44).

As mentioned above, because the OADM device 1 in accordance with this Embodiment 1 is constructed in such a way as to piggyback the ID number of a corresponding transmitting port onto a wavelength multiplexed light signal and a light signal with amplitude modulation using the variable optical attenuators 72 and 73, and carryout a determination of whether this ID number matches an expected value, the OADM device 1 can detect a connection failure occurring in the optical patch cables 12 to 14 by using a low cost method even though the OADM device 1 is constructed in such a way that the transmission and reception ports of the optical multiplexing/demultiplexing unit 5 can be set up arbitrarily, thereby being able to contribute to quick installation thereof and reduction in the time required to restore itself to proper working condition when an emergency failure is occurring. Further, there is provided an advantage of being able to provide an improvement in the maintainability while avoiding an increase in the cost of the OADM device.

Although the OADM device in accordance with Embodiment 1 is constructed in such a way that when the ID number management unit 91 determines that the ID number does not match the expected value, the device control unit 9 notifies an maintenance operator to that effect, the OADM device can be alternatively constructed in such a way that when the ID number management unit determines that the ID number does not match the expected value, either the attenuator control circuit 74 or the optical reception detector 84 notifies an maintenance operator to that effect.

Embodiment 2

In Embodiment 1, the example in which the OADM device piggybacks the ID number of a corresponding transmitting port to light signals with amplitude modulation is shown. This method may degrade the transmission ability though the degradation is small and is not significant in the design of the OADM device 1. To eliminate the possibility that the transmission ability degrades, in accordance with Embodiment 2, an OADM device which is constructed in such a way as to determine the connection state of each of the optical patch cables 12 to 14 only when the reception of a wavelength multiplexed light signal or a light signal is restored from a break (disconnection) state at a receiving port, such as when the OADM device 1 is constructed or when fault restoration is carried out is shown. The OADM device 1 in accordance with this Embodiment 2 has the same structure as the OADM device 1 in accordance with Embodiment 1 shown in FIG. 1, and the structure will be explained here after with reference to FIG. 1.

Figure 5:
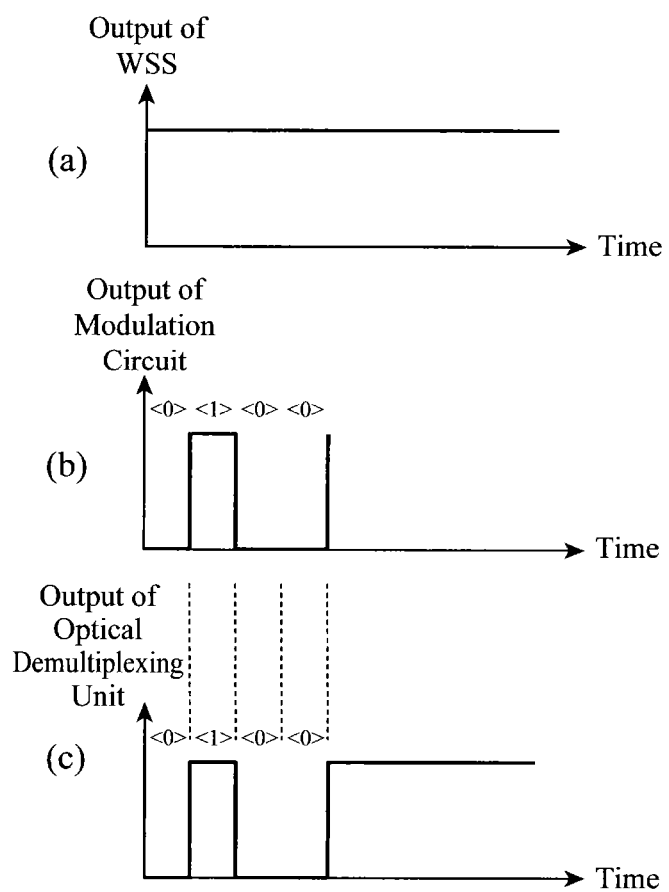
FIG. 5 is a view explaining the piggybacking of an ID number which is carried out by an OADM device in accordance with Embodiment 2 of the present invention.

FIG. 5 is a view for explaining the piggybacking of an ID number in the OADM device 1 in accordance with Embodiment 2 of the present invention. FIG. 5(a) is a view showing an output of a wavelength select switch 71, FIG. 5(b) is a view showing an output of a modulating circuit 75, and FIG. 5(c) is a view showing an output of an optical demultiplexing unit 7. The determination of the connection state of an optical patch cable 14 will be explained hereafter. When determining that the reception of a wavelength multiplexed light signal at a receiving port is in a break state on the basis of the light level of the wavelength multiplexed light signal detected by an optical reception detector 84, the modulating circuit 75 piggybacks the ID number of a corresponding transmitting port onto the wavelength multiplexed light signal with ON/OFF modulation using a variable optical attenuator 73, as shown in FIG. 5.

After that, when the reception of the wavelength multiplexed light signal is restored from the break state at the receiving port, a demodulating circuit 86 becomes able to extract the ID number from the light level of this wavelength multiplexed light signal. An ID number management unit 91 then compares the ID number extracted by the demodulating circuit 85 with a set expected value to determine whether they match each other. The ID number management unit 91 also provides an ID number piggybacking end notification that it ends the piggybacking of an ID number for the modulating circuit 75 when completing the determination of whether the ID number matches the expected value. When receiving the ID number piggybacking end notification from the ID number management unit 9, the modulating circuit 75 ends the piggybacking of an ID number.

Also when determining the connection state of each of the optical patch cables 12 and 13, by similarly piggybacking the ID number when the reception of a light signal is in a break state at a receiving port, the OADM device determines whether the ID number matches an expected value only when the reception of the light signal is restored from the disconnection state at the receiving port.

As mentioned above, because the OADM device 1 in accordance with this Embodiment 1 is constructed in such a way as to, when the reception of a wavelength multiplexed light signal (or a light signal) is in a break state at a receiving port, piggyback the ID number of a corresponding transmitting port onto the wavelength multiplexed light signal (or the light signal) with ON/OFF modulation using the variable optical attenuator 73 (or 72), and carry out a determination of whether the ID number matches an expected value only when the reception of the wavelength multiplexed light signal (or the light signal) is restored from the break state at the receiving port, the OADM device 1 can detect a connection failure occurring in the optical patch cables 12 to 14 by using a low cost method even though the OADM device 1 is constructed in such a way that the transmission and reception ports of an optical multiplexing/demultiplexing unit 5 can be set up arbitrarily, thereby being able to contribute to quick installation thereof and reduction in the time required to restore itself to proper working condition when an emergency failure is occurring. Further, there is provided an advantage of being able to provide an improvement in the maintainability while avoiding an increase in the cost of the OADM device. Further, although the sequence control in this case is carried out through S/W control in an FPGA or a CPU, switching to new parts does not have to be done because the sequence control is simple, and the sequence control can be implemented at a low cost.

Embodiment 3

In the OADM device in accordance with Embodiment 1, the single optical multiplexing/demultiplexing unit 5 is disposed as shown in FIG. 1. As an alternative, the OADM device can be constructed in such a way as to include an n-stage optical multiplexing/demultiplexing unit in which two or more optical multiplexing/demultiplexing units 5 are disposed. Even in the case in where the OADM device includes the n-stage optical multiplexing/demultiplexing unit 5, variations in the light level of a wavelength multiplexed light signal onto which an ID number is piggybacked by a previous-stage optical multiplexing/demultiplexing unit 5 are suppressed because variable optical attenuators 72 and 73 originally carry out a control operation of suppressing variations in light levels. Therefore, the next-stage optical multiplexing/demultiplexing unit 5 can further piggyback the ID number onto the wavelength multiplexed light signal onto which the ID number is piggybacked by the previous-stage optical multiplexing/demultiplexing unit 5. This number n of stages can be determined in such a way that the attenuation of the light level of the wavelength multiplexed light signal falls within a permissible range of the attenuation.

Embodiment 4

Figure 6:
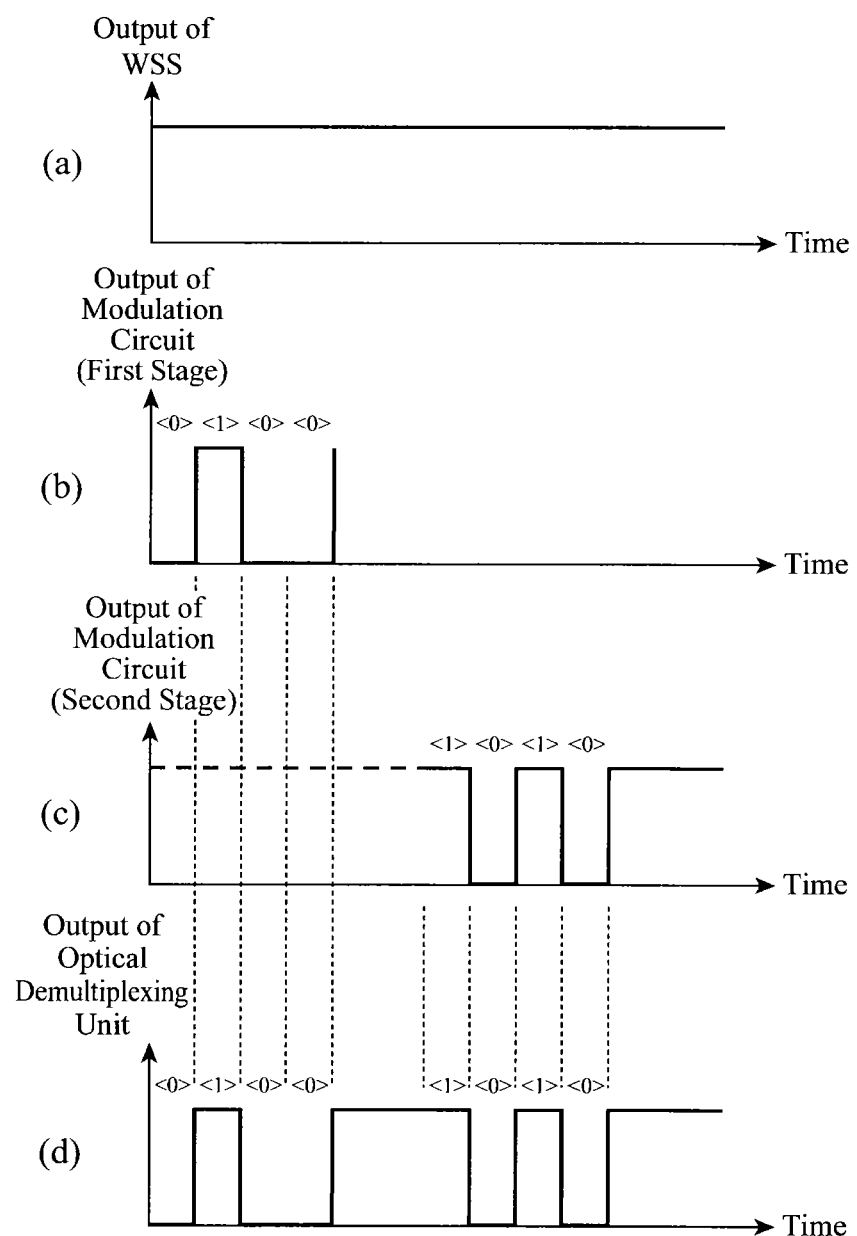
FIG. 6 is a view explaining the piggybacking of an ID number which is carried out by an OADM device in accordance with Embodiment 4 of the present invention.

In the OADM device in accordance with Embodiment 2, the single optical multiplexing/demultiplexing unit 5 is disposed as shown in FIG. 1. As an alternative, the OADM device can be constructed in such a way as to include an n-stage optical multiplexing/demultiplexing unit in which two or more optical multiplexing/demultiplexing units 5 are disposed. Even in the case in where the OADM device includes the n-stage optical multiplexing/demultiplexing unit 5, by carrying out time division multiplexing of ID numbers in order, the OADM device can extract an ID number in the optical multiplexing unit 8 in each stage, as shown in FIG. 6. The ID number management unit 91 can set this number n of stages arbitrarily in the system by providing a notification of the completion of transmission of an ID number to the modulating circuit 75 when completing the determination of whether the ID number matches an expected value.

Industrial Applicability

As mentioned above, because the OADM (Optical Add-Drop Multiplexer) device in accordance with the present invention can contribute to quick installation thereof and reduction in the time required to restore itself to proper working condition when an emergency failure is occurring, the OADM device in accordance with the present invention is suitable for use as an OADM device which transmits a light signal by using a wavelength division multiplex technique, for monitoring a connection in each optical patch cable used therein, and so on.

Expanations Of Reference Numerals

1 OADM device, 2 Received light amplifying unit, 3 Signal transmitting unit, 4 Signal receiving unit, 5 Optical multiplexing/demultiplexing unit, 6 Transmission light amplifying unit, 7 Optical demultiplexing unit, 8 Optical multiplexing unit, 9 Device control unit (notifying unit), 10 to 14 Optical patch cables, 71 Wavelength select switch (optical multiplexing functional unit), 72 First variable optical attenuator, 73 Second variable optical attenuator, 74 Attenuator control circuit (notifying unit), 75 Modulating circuit, 81 First optical branching circuit, 82 Second optical branching circuit, 83 Wavelength select switch (optical demultiplexing functional unit), 84 Optical reception detector (notifying unit), 85 Demodulating circuit, 91 ID number management unit, 101 and 102 Transmission lines.

The invention claimed is:

1. An OADM device provided with an optical multiplexing/demultiplexing unit having an optical demultiplexing functional unit for demultiplexing a received light signal and transmitting a light signal via a transmitting port to which an optical patch cable is connected, and an optical multiplexing functional unit for multiplexing a light signal received via a receiving port to which said optical patch cable is connected, wherein said optical multiplexing/demultiplexing unit comprises:

a variable optical attenuator for attenuating a light signal into which the received light signal is demultiplexed by said optical demultiplexing functional unit;

a modulating circuit for piggybacking an ID number of said corresponding transmitting port onto said light signal by using said variable optical attenuator;

an optical reception detector for detecting a light level of the light signal received via said receiving port;

a demodulating circuit for extracting the ID number from the light level detected by said optical reception detector;

an ID number management unit for determining whether the ID number extracted by said demodulating circuit matches a preset ID number; and a notifying unit for notifying a connection failure occurring in said optical patch cable when said ID number management unit determines that there is a mismatch between the ID number extracted by said demodulating circuit and the preset ID number, wherein when determining that the reception of the light signal is in a break state at said receiving port on a basis of the light level detected by said optical reception detector, said modulating circuit piggybacks the ID number of the corresponding transmitting port onto said light signal.

2. The OADM device according to claim 1, wherein a plurality of stages each of which is said optical multiplexing/demultiplexing unit are connected in series, and said variable optical attenuator of each of the stages suppresses variations in light level of a light signal onto which an ID number is piggybacked by the modulating circuit of a previous stage.

3. The OADM device according to claim 1, wherein a plurality of stages each of which is said optical multiplexing/demultiplexing unit are connected in series, and said modulating circuit of each of the stages time division-multiplexes an ID number and said light signal.

* * * * *